(12) United States Patent
Meyers

(10) Patent No.: US 11,183,086 B2
(45) Date of Patent: Nov. 23, 2021

(54) WIRELESS SECURITY FOR FREIGHT CONTAINER SEALS

(71) Applicant: Globe Tracker, ApS, Copenhagen (DK)

(72) Inventor: Richard Meyers, Longboat Key, FL (US)

( * ) Notice: Subject to any disclaimer, the term of this patent is extended or adjusted under 35 U.S.C. 154(b) by 593 days.

(21) Appl. No.: 16/040,528

(22) Filed: Jul. 19, 2018

(65) Prior Publication Data

US 2019/0027069 A1  Jan. 24, 2019

Related U.S. Application Data

(60) Provisional application No. 62/534,657, filed on Jul. 19, 2017.

(51) Int. Cl.
| | |
|---|---|
| *G09F 3/03* | (2006.01) |
| *G08B 13/08* | (2006.01) |
| *G08B 25/10* | (2006.01) |
| *G06Q 10/08* | (2012.01) |
| *G08B 13/24* | (2006.01) |

(52) U.S. Cl.
CPC .......... *G09F 3/0317* (2013.01); *G09F 3/0329* (2013.01); *G09F 3/0376* (2013.01); *G06Q 10/083* (2013.01); *G08B 13/08* (2013.01); *G08B 13/2462* (2013.01); *G08B 25/10* (2013.01)

(58) Field of Classification Search
CPC ........ G08B 13/00; G08B 13/02; G08B 13/06; G08B 13/14; G08B 13/1409; G08B 13/1436; G08B 13/1472; G08B 13/149; E05B 1/00; E05B 1/0015; E05B 39/00; E05B 39/005; E05B 59/00; E05C 1/00; G06F 3/03; G06F 3/0317; G06F 3/0329; G06F 3/0376
See application file for complete search history.

(56) References Cited

U.S. PATENT DOCUMENTS

| | | | |
|---|---|---|---|
| 2009/0108597 A1* | 4/2009 | Terry | G09F 3/0317 292/327 |
| 2010/0326145 A1* | 12/2010 | Powers | E05B 39/005 70/158 |
| 2017/0009491 A1* | 1/2017 | Nguyen | G07C 9/00944 |
| 2018/0018843 A1* | 1/2018 | Gengler | G07C 9/00571 |
| 2018/0114386 A1* | 4/2018 | Steinmetz | E05B 39/005 |

* cited by examiner

*Primary Examiner* — Van T Trieu
(74) *Attorney, Agent, or Firm* — Ryan Alley IP

(57) ABSTRACT

Systems and methods can secure freight container seals using electronic sensors. A hardened sensor clamp housing can include one or more sensing portals. The sensor clamp housing can receive a bolt seal through each of the sensing portals. One or more seal sensors may be positioned proximate to the sensing portals to sense a physical characteristic of the inserted bolt seal. This characteristic may be electrical, optical, magnetic, or so forth. The seal sensors can generate an electrical signal associated with cutting or tampering with the inserted bolt seal. The electrical signal can be coupled to a sensor clamp module operable to determine a tamper state of the bolt seal in response to the associated electrical signal. The determined tamper state can be communicated via a sensor clamp wireless module to a container controller or communications gateway.

17 Claims, 7 Drawing Sheets

WIRELESS SECURITY FOR FREIGHT CONTAINER SEALS

RELATED APPLICATION

This application claims priority to U.S. Provisional Patent Application No. 62/534,657, filed Jul. 19, 2017 and entitled "Wireless Security For Freight Container Seals." The complete disclosure of the above-identified priority application is hereby fully incorporated herein by reference.

BACKGROUND

Freight containers, also known as cargo containers or intermodal containers, are standardized shipping containers operable for use across different modes of transport such as ships, railroad, or trucking. The closure latches or hasps on the doors of freight containers can be secured with seals such as bolt seals or cable seals.

There is a need in the art for freight container seals that are tamper resistant, tamper detecting, and compatible with electronic tracking technology.

SUMMARY

Technologies are described herein for systems and methods to secure freight container seals using electronic sensors. A hardened sensor clamp housing can include one or more sensing portals. The sensor clamp housing can receive a bolt seal through each of the sensing portals. One or more seal sensors may be positioned proximate to the sensing portals to sense a physical characteristic of the inserted bolt seal. This characteristic may be electrical, optical, magnetic, or so forth. The seal sensors can generate an electrical signal associated with cutting or tampering with the inserted bolt seal. The electrical signal can be coupled to a sensor clamp module operable to determine a tamper state of the bolt seal in response to the associated electrical signal. The determined tamper state can be communicated via a sensor clamp wireless module to a container controller or communications gateway.

It should be appreciated that the described subject matter may be implemented as an apparatus, a system, an article of manufacture, or methods/processes associated therewith. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
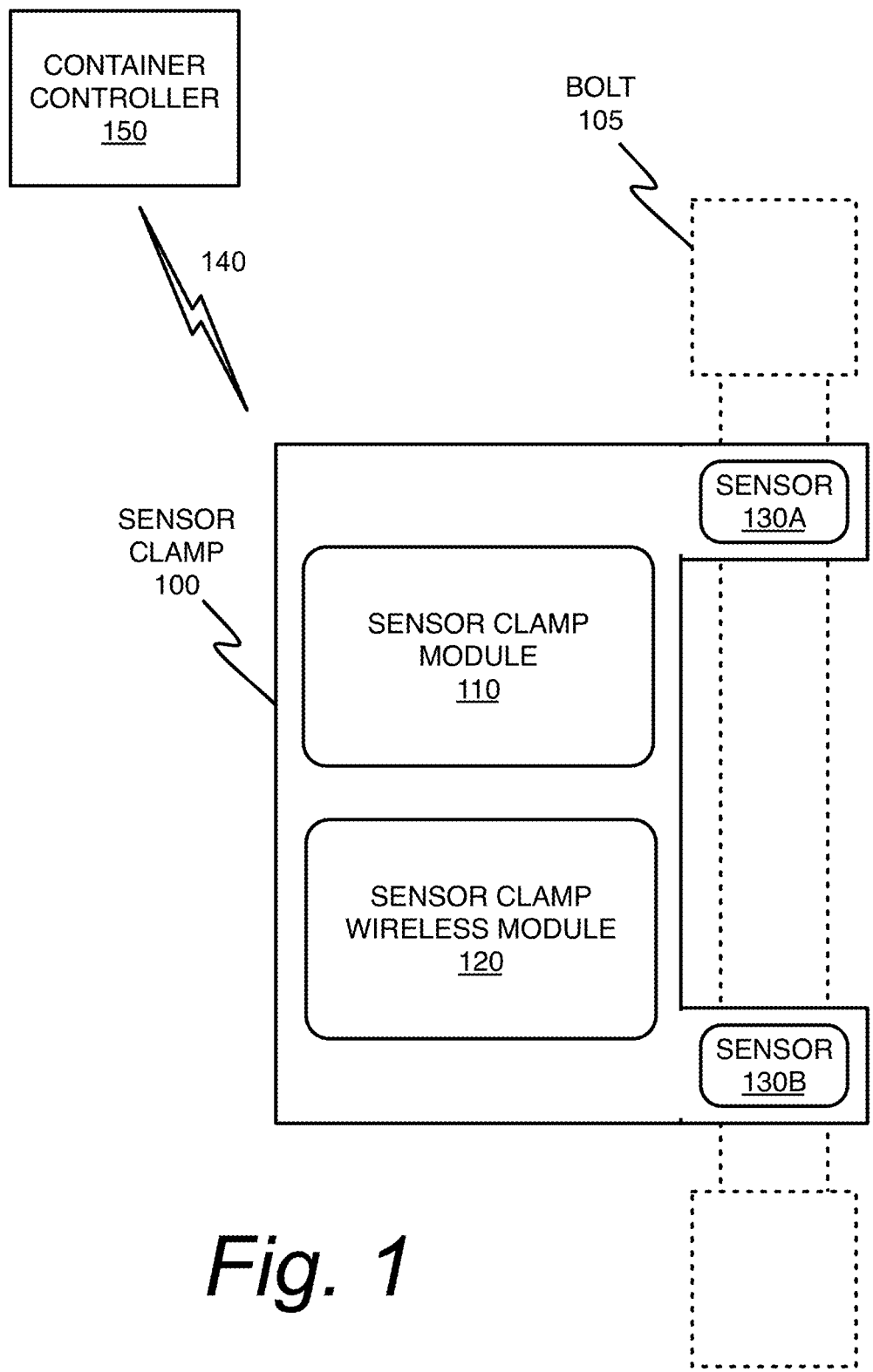
FIG. 1 illustrates a sensor clamp for securing a bolt seal in accordance with one or more embodiments presented herein.

The following description is directed to technologies for wirelessly securing freight container seals using electromagnetic sensors. The closure latches or hasps on the doors of freight containers can be secured with seals such as bolt seals or cable seals. Sensor clamp assemblies and instrumented bolt seals can support detecting disruption, such as severing or removal, of the seals used to secure freight containers.

Electromagnetic or optical sensing may be used to evaluate continuity of various freight container seal mechanisms. When the seal is disrupted, due to cutting or otherwise, sensors can detect a loss of, or change in, continuity. One or more electronic modules can analyze the sensor data and wirelessly transmit information about the seal and the sensor assembly to a container controller, other computing device, logging system, or a communications gateway.

In the following detailed description, references are made to the accompanying drawings that form a part hereof, and which are shown by way of illustration specific embodiments or examples. Referring now to the drawings, in which freight container seal security using electromagnetic sensors will be presented.

FIG. 1 illustrates a sensor clamp 100 for securing a bolt seal 105 in accordance with one or more embodiments presented herein. The bolt seal 105 may be positioned within the latch assembly or hasp of a freight container to provide security against opening as well as tamper evidence. The sensor clamp 100 may comprise seal sensors 130 (such as seal sensor 130A and seal sensor 130B as illustrated here). The seal sensors 130 can detect physical characteristics associated with the bolt seal 105 placed within, or proximate to, the seal sensors 130. A sensor clamp module 110 can activate and interrogate the seal sensors 130. A sensor clamp wireless module 120 may be associated with the sensor clamp module 110. The sensor clamp wireless module 120 can communicate information over a wireless link 140 to a container controller 150, or some other system. Such an other system may include a WiFi based system, a fixed LoRa infrastructure (private or public), satellite phone, or other controller or gateway system.

The sensor clamp 100 may comprise a secure housing (such as hardened metal). The structure of the secure housing can support positioning the sensor clamp 100 around, or proximate to, the bolt seal 105. For example, the bolt seal 105 may insert through openings within the secure housing of the sensor clamp 100. The structure of the sensor clamp 100 may substantially comprise a "C" or "U" shape.

The sensor clamp 100 may comprise one or more electronic modules such as the sensor clamp module 110 and the sensor clamp wireless module 120. These modules may comprise electronics, microcontrollers, computing machines, digital logic, system-on-chip packages, programmable logic, embedded software/firmware, radio frequency circuitry, mixed signal circuitry, optoelectronics, and/or other electronics technology for supporting the technology presented herein.

The sensor clamp 100 may comprise one or more seal sensors 130. The seal sensors 130 may comprise electromagnetic or inductive continuity detectors to identify cutting or manipulation of the bolt seal 105. The seal sensors 130 may comprise proximity sensors. The seal sensors 130 may comprise Hall Effect sensors. Hall Effect sensors may comprise transducers that vary output voltage in response to a magnetic field.

The sensor clamp 100 may also comprise an electromagnetic transmitting element on one end 130A and a receiving element on the other end 130B. A short duration RF sign may be transmitted using the bolt 105 as a conductive element (similar to an antenna). Severing, or physical removal of the bolt 105 may be detected by a digital signal processing functionality associated with the sensor clamp module 110.

The sensor clamp 100 and associated seal sensors 130 may be used to detect disruption in the bolt seal 105, such as an ISO 17712 seal, or other types of freight container seals, such as cable seals. It should be appreciated that while the bolt seal 105 is used as an example seal in much of this disclosure, the sensor clamp 100 and technology presented herein may also be employed with cable seals and various other types of container seals. The attachment mechanism of the bolt seal 105 may be screw-style, bayonet, or otherwise. The technology presented herein is independent of the type of seal and also independent of the specific structure, such as the specific style of bolt seal.

The sensor clamp module 110 can interrogate the state of the bolt seal 105 via the seal sensors 130. The sensor clamp module 110 can read the seal sensors 130 using a reduced duty cycle to conserve energy. The sensor clamp module 110 may be powered by battery or other mobile power source located within, or associated with, the sensor clamp 100. Information associated with the sensor clamp 100 and the bolt seal 105 may be collected and processed by the sensor clamp module 110. The information or processing results may be wirelessly communicated via the sensor clamp wireless module 120. The sensor clamp 100 and sensor clamp module 110 may incorporate GPS, RFID, or other technologies for identification or geolocation.

The sensor clamp wireless module 120 can communicate over the wireless link 140. The sensor clamp wireless module 120 can communicate using various wireless technologies such as LoRa, LTE CAT-M1, any narrow band IoT wireless communication standard, Wi-Fi, Bluetooth, GSM, CDMA, satellite link, WLAN, WiMax, packet radio, software defined radio, and so forth. The sensor clamp wireless module 120 can communicate over the wireless link 140 to the container controller 150, a ship-board system, a ground transit system, port system, cloud-based system, or any other computing machine configured to receive information regarding the sensor clamp 100. The container controller 150 may be a computing machine associated with the freight container associated with, or secured by, the bolt seal 105. The container controller 150 may be associated with other functions of the freight container such as geolocation, tracking, security, management, refrigeration, monitoring, and communications gateway.

Figure 7:
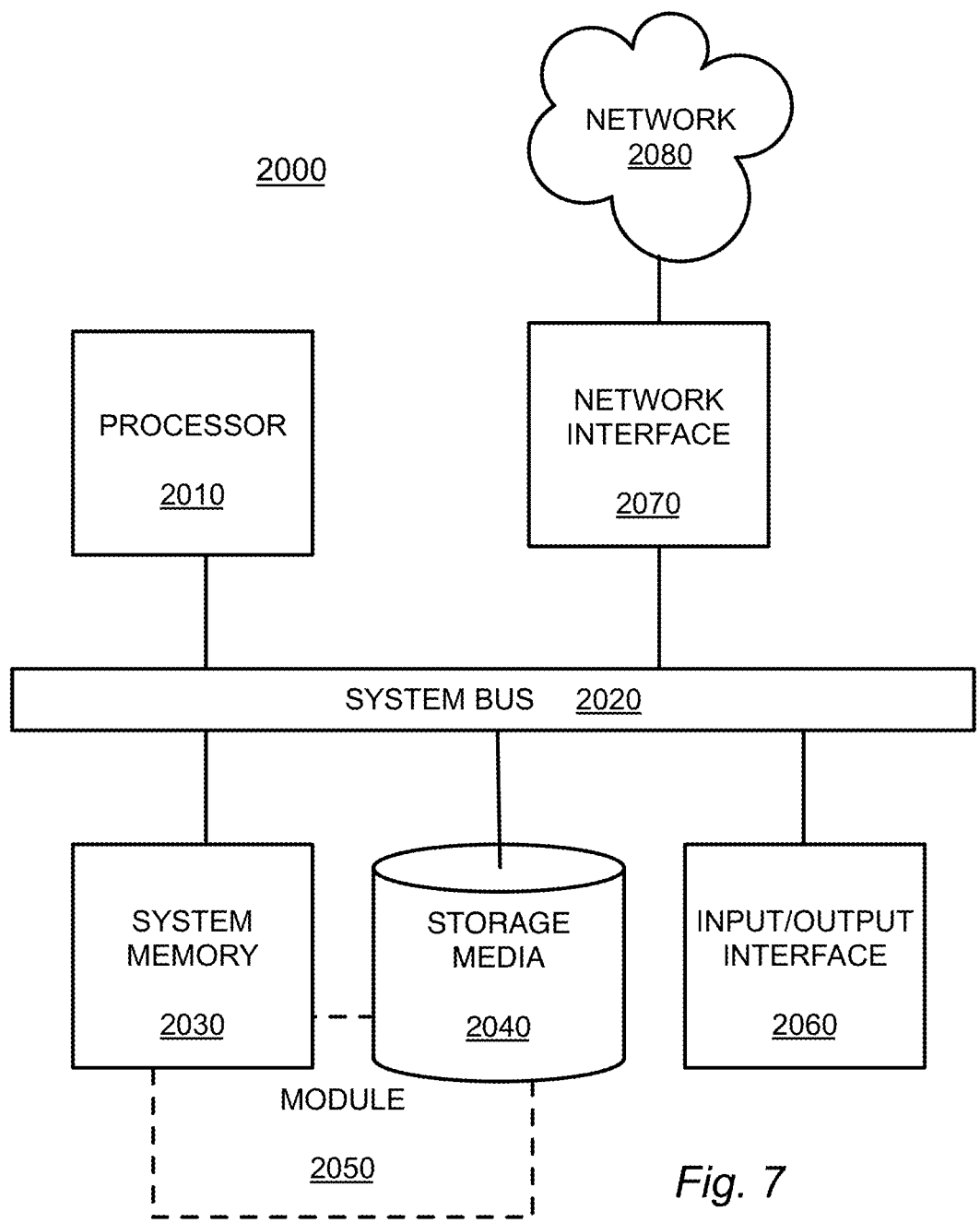
FIG. 7 is a block diagram depicting a computing machine and a module in accordance with one or more embodiments of the technology presented herein.

The sensor clamp module 110, container controller 150, or any other systems associated with the technology presented herein may be any type of computing machine such as, but not limited to, those discussed in more detail with respect to FIG. 7. Furthermore, any modules (such as the sensor clamp module 110 or the sensor clamp wireless module 120) associated with any of these computing machines or any other modules (scripts, web content, software, firmware, or hardware) associated with the technology presented herein may by any of the modules discussed in more detail with respect to FIG. 7. The computing machines discussed herein may communicate with one another as well as other computer machines or communication systems over one or more networks or communication links such as the wireless link 140. These communication mechanisms may include any type of data or communications network including any of the network technology discussed with respect to FIG. 7.

Figure 2:
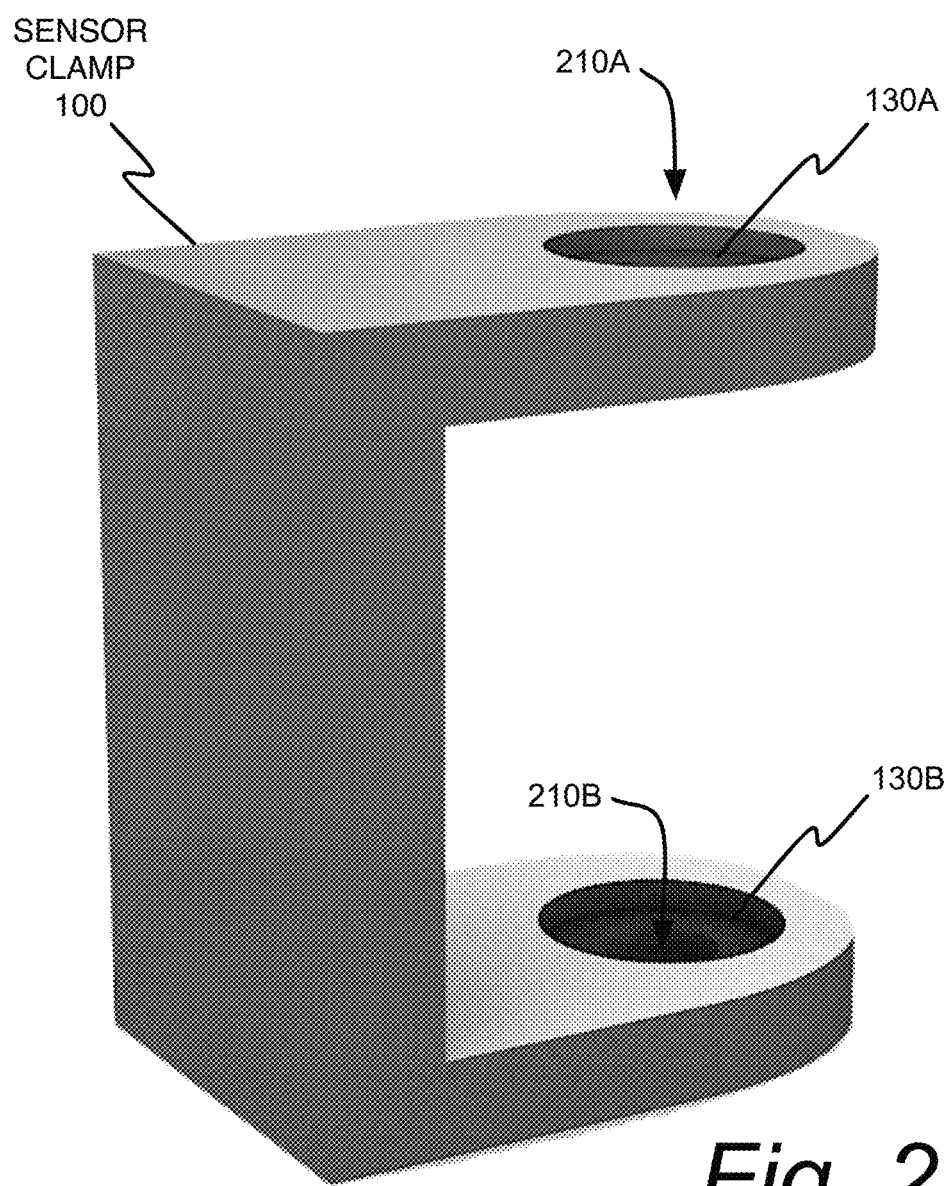
FIG. 2 illustrates a sensor clamp according to one or more embodiments of the technology presented herein.

FIG. 2 illustrates a sensor clamp 100 according to one or more embodiments of the technology presented herein. The sensor clamp 100 may comprise sensing portals 210A and 210B respectively proximate to seal sensors 130A and 130B. The sensing portals 210A and 210B may be configured in size, shape, and orientation to support insertion and interlocking with the bolt seal 105 or other container seal technology.

Figure 3:
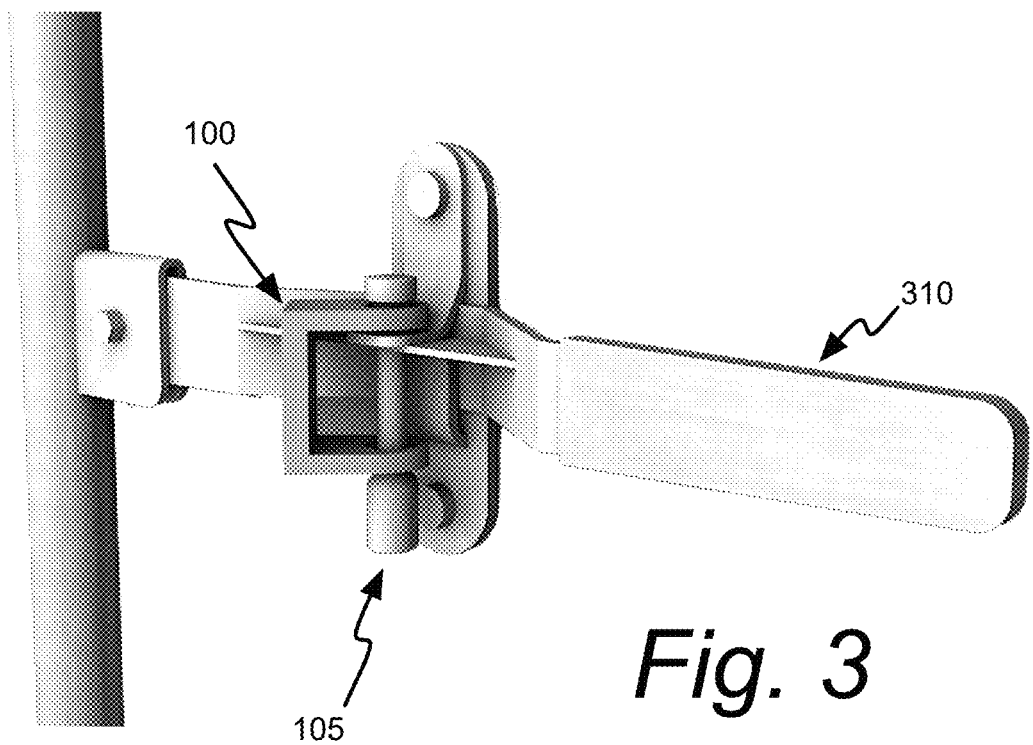
FIG. 3 illustrates a container latch assembly secured by a bolt seal according to one or more embodiments of the technology presented herein.

FIG. 3 illustrates a container latch assembly 310 secured by a bolt seal 105 according to one or more embodiments of the technology presented herein. The bolt seal 105 may be inserted through both the sensor clamp 100 and the container latch assembly 310 such that any cutting, or other disruption, of the bolt seal 105 may be sensed and communicated by the sensor clamp 100 and its associated modules.

Figure 4:
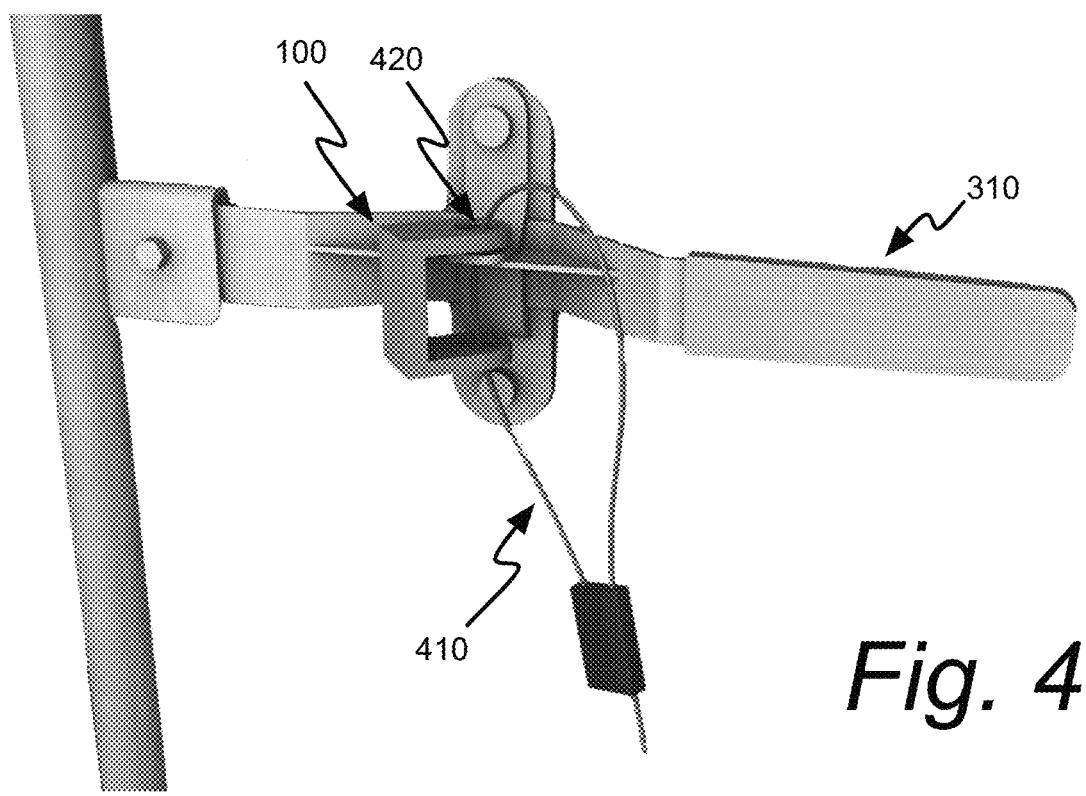
FIG. 4 illustrates a container latch assembly secured by a cable seal according to one or more embodiments of the technology presented herein.

FIG. 4 illustrates a container latch assembly 310 secured by a cable seal 410 according to one or more embodiments of the technology presented herein. The cable seal 410 may be inserted through both the sensor clamp 100 and the container latch assembly 310 such that any cutting, or other disruption, of the cable seal 410 may be sensed and communicated by the sensor clamp 100 and its associated modules. Insert sleeves 420 may be positioned within the sensing portals 210 of the sensor clamp 100 to accommodate the cross-sectional geometry of the cable seal 410.

Figure 5:
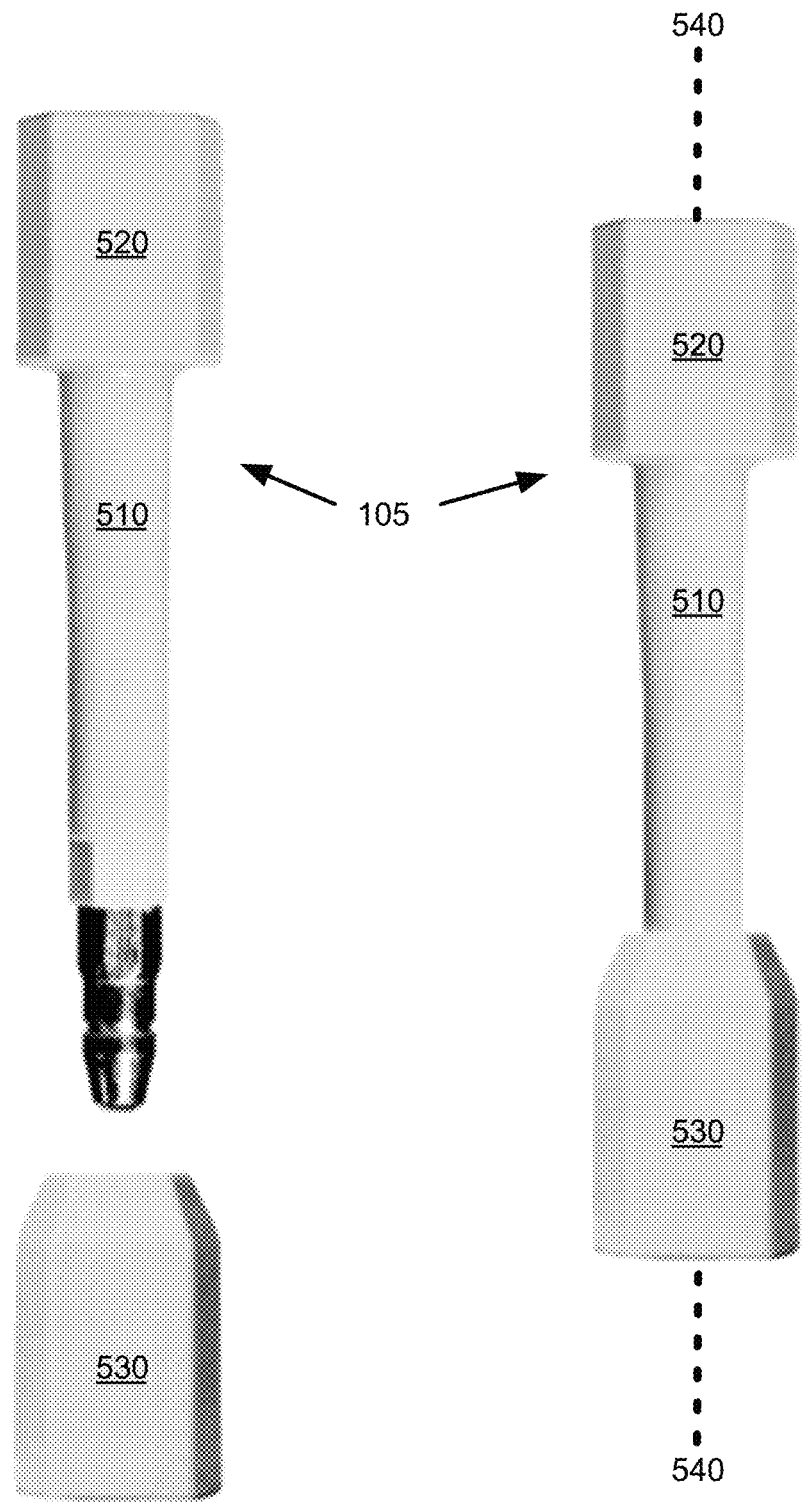
FIG. 5 illustrates a bolt seal with integrated sensing and communication functionality according to one or more embodiments of the technology presented herein.

FIG. 5 illustrates a bolt seal 105 with integrated sensing and communication functionality according to one or more embodiments of the technology presented herein. The bolt seal 105 comprises a bolt shaft 510 connected to a fixed bolt end 520. The bolt shaft 510 may be securely coupled to a removable bolt end 530 to provide physical security, tamper evidence, sensing, and communications functionality. A void or sensor coupling may be positioned through the bolt shaft 510 along a central axis 540 between the fixed bolt end 520 and the removable bolt end 530.

An example bolt seal 105 with integrated sensing functionality may comprise a void positioned through the bolt shaft 510 along a central axis 540, an optical emitter on the fixed bolt end 520 and an optical sensor on the removable bolt end 530. Alternatively, the emitter and sensor end may be reversed, or in the same side of the bolt with a reflective area at the removable bolt end 530. The optical emitter may be an LED, LASER, or other source of optical or electromagnetic radiation. The optical sensor may be configured to detect disruption of the radiation from the emitter. For example, if the bolt shaft 510 is cut.

A battery may be included in both the fixed bolt end 520 and the removable bolt end 530 to support powering both the emitter and the sensor. Alternatively, one end may be actively powered, while the other end of the void along the central axis 540 comprises a reflector, excitable material, florescent material, or other mechanism for relaying or transforming the radiation from the emitter end of the void back to a detector on the emitter end in a fashion that can be sensed to indicate that the void along the central axis 540 has been disrupted.

The optical sensor may be coupled to electronics analogous to the sensor clamp module 110 and/or the sensor clamp wireless module 120 presented herein. Accordingly, the bolt seal 105 with integrated sensing functionality can support communication over the wireless link 140 to the container controller 150 (or other systems) as presented herein.

The portions of the fixed bolt end 520 and the removable bolt end 530 housing the electronics, batteries, and/or passive elements can be configured to be removable and attachable to support replacement of the severed bolt shaft 510 after use without need to discard the electronics. According to one or more embodiment, the bolt ends 520 and 530 may be coupled to, such as screwed onto, the ends of the bolt 105.

The seal sensors 130 may comprise ultrasonic signal or electromagnetic pulse detectors. The seal sensors 130 may comprise frequency dependent or frequency independent light emitters and/or detectors. The seal sensors 130 may comprise light diffuser lenses and/or light focusing lenses.

The sensor clamp 100 may comprise RFID, optical RFID, single-wire ID code devices, or other identification technology.

Figure 6:
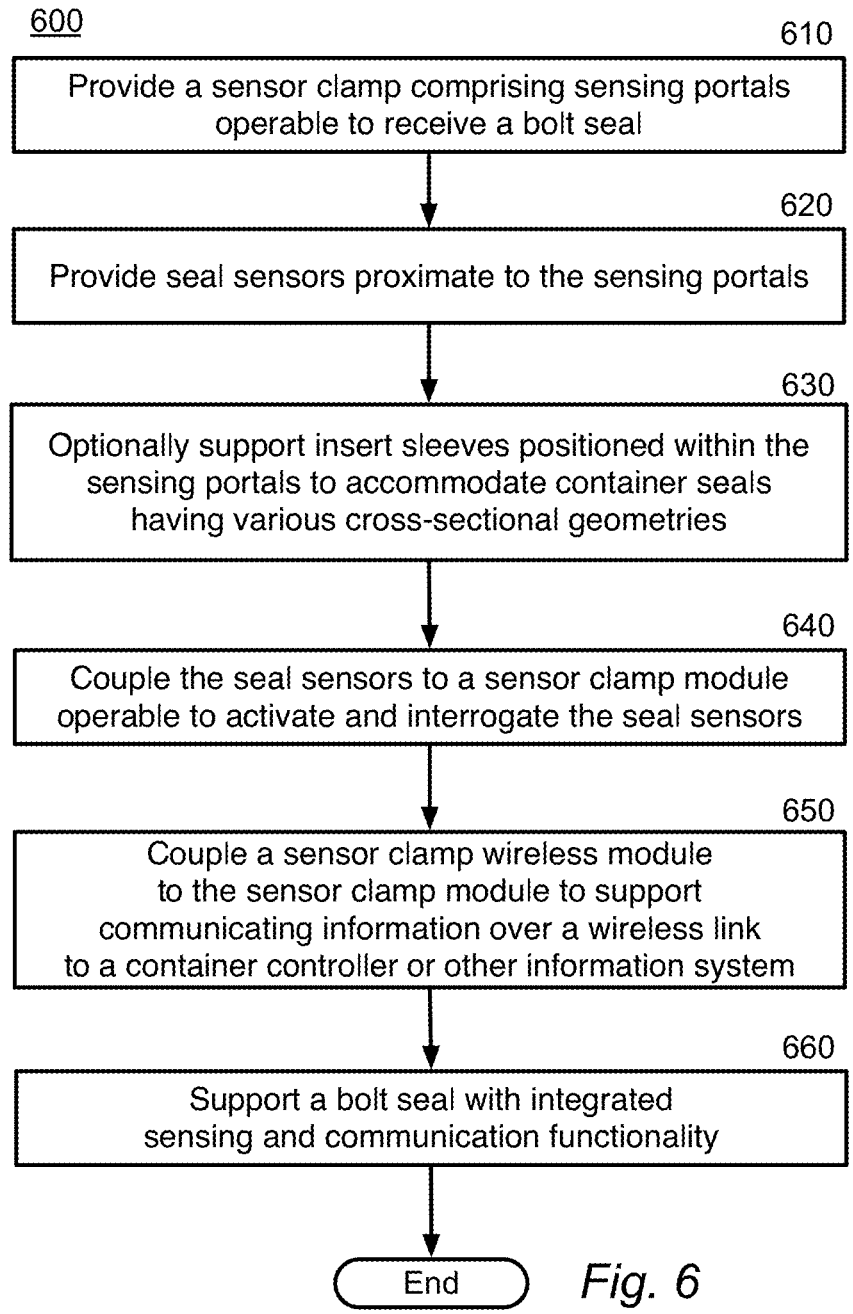
FIG. 6 is a block flow diagram depicting a method for wirelessly securing freight container seals using electromagnetic sensors in accordance with one or more embodiments of the technology presented herein.

FIG. 6 is a block flow diagram depicting a method 600 for wirelessly securing freight container seals using electromagnetic sensors in accordance with one or more embodiments presented herein. According to methods and blocks described in the embodiments presented herein, and, in alternative embodiments, certain blocks can be performed in a different order, in parallel with one another, omitted entirely, and/or combined between different example methods, and/or certain additional blocks can be performed, without departing from the scope and spirit of the invention. Accordingly, such alternative embodiments are included in the invention described herein.

In block 610, a sensor clamp 100 comprising sensing portals 210 may be provided. The sensor clamp 100 may be operable to receive a bolt seal 105 through the sensing portals 210.

In block 620, seal sensors 130 may be positioned proximate to the sensing portals 210. The seal sensors 130 can detect physical characteristics associated with the bolt seal 105 placed within, or proximate to, the seal sensors 130. The physical characteristics can include electrical conductivity, Hall effect activation, optical characteristics, radio frequency interactions, magnetic characteristics, and so forth. The physical characteristics may be useful to detect if the bolt seal 105 has been cut, altered, replaced, opened, or otherwise tampered with.

In block 630, insert sleeves may be positioned within the sensing portals 210 to accommodate container seals having various cross-sectional geometries from the bolt seal 105. For example, a cable seal 410 may have a significantly smaller cross-sectional geometry than a bolt seal 105.

In block 640, the seal sensors 130 may be coupled to a sensor clamp module 110. The sensor clamp module 110 may be operable to activate and interrogate the seal sensors 130.

In block 650, a sensor clamp wireless module 120 may be coupled to the sensor clamp module 110 to support communicating information over a wireless link 140 to a container controller 150 or other computing machine. For example, the other computing machine may include a WiFi based system, a fixed LoRa infrastructure (private or public), a satellite phone, or other controller or gateway system.

In block 660, a bolt seal 105 with integrated sensing and communication functionality may be supported. The bolt seal 105 with integrated sensing and communication functionality may comprises a bolt shaft 510 connected to a fixed bolt end 520. The bolt shaft 510 may be securely coupled to a removable bolt end 530 to provide physical security, tamper evidence, sensing, and communications functionality. A void or sensor coupling may be positioned through the bolt shaft 510 along a central axis 540 between the fixed bolt end 520 and the removable bolt end 530.

An example bolt seal 105 with integrated sensing functionality may comprise a void positioned through the bolt shaft 510 along a central axis 540, an optical emitter on the fixed bolt end 520 and an optical sensor on the removable bolt end 530. Alternatively, the emitter and sensor end may be reversed, or in the same side of the bolt with a reflective area at the removable bolt end 530. The optical emitter may be an LED, LASER, or other source of optical or electromagnetic radiation. The optical sensor may be configured to detect disruption of the radiation from the emitter. For example, if the bolt shaft 510 is cut.

FIG. 7 depicts a computing machine 2000 and a module 2050 in accordance with one or more embodiments presented herein. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 also may include volatile memories, such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCP"), PCI express (PCIe), serial bus, parallel bus, advanced technology attachment ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, biometric readers, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks ("WAN"), local area networks ("LAN"), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with a opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

One or more aspects of embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the invention should not be construed as limited to any one set of computer program instructions. Further, a skilled programmer would be able to write such a computer program to implement an embodiment of the disclosed invention based on the appended flow charts and associated description in the application text. Therefore, disclosure of a particular set of program code instructions is not considered necessary for an adequate understanding of how to make and use the invention. Further, those skilled in the art will appreciate that one or more aspects of the invention described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays ("FPGA"), etc.

Based on the foregoing, it should be appreciated that technologies for wireless security associated with freight container seals are presented herein. Although the subject matter presented herein has been described in language specific to various example embodiments, it is to be understood that the invention disclosed herein is not necessarily limited to the specific features, materials, dimensions, or structures described herein. Rather, the specific features, materials, dimensions, and structures are disclosed as example forms of implementation. The subject matter described above is provided by way of illustration only and should not be construed as limiting. Various modifications, combinations, and changes may be made to the subject matter described herein without following the example embodiments and applications illustrated and described, and without departing from the true spirit and scope of the present invention.

What is claimed is:

1. A method for securing freight container seals with a sensor clamp housing including a sensor clamp processor, a sensor clamp wireless transmitter, and one or more sensing portals and associated seal sensor within the sensor clamp housing, the sensor clamp housing being configured to receive a bolt seal through each of the one or more sensing portals, the method comprising:
    sensing a physical characteristic of the bolt seal with one or more seal sensors and generating an associated electrical signal with the seal sensor, wherein the sensing includes transmitting an RF signal through the bolt seal as an antenna at a first end of the bolt seal and detecting the RF signal with the seal sensor at a second end of the bolt seal opposite the first end;
    receiving the electrical signal at the sensor clamp processor;
    determining, with the sensor clamp processor, a tamper state of the bolt seal from contents of the electrical signal; and
    transmitting the determined tamper state from the sensor clamp wireless transmitter to communicate wirelessly to a container controller or communications gateway.

2. The method of claim 1, wherein all the seal sensors, sensor clamp processor, and sensor clamp wireless transmitter are secured inside the sensor clamp housing, and wherein the sensor clamp housing is fabricated of hardened metal to resist tampering.

3. The method of claim 2, wherein a battery is further secured inside the sensor clamp housing.

4. The method of claim 1, wherein the physical characteristic of the bolt seal comprises one of electrical conductivity, optical detection, radio frequency detection, or magnetic reactivity.

5. The method of claim 1, further comprising:
    supporting insert sleeves positioned within the sensing portals to accommodate container seals having various cross-sectional geometries.

6. The method of claim 1, wherein the sensing further includes sensing physical continuity of the bolt seal with an optical emitter and receiver in the bolt seal and generating an associated electrical signal from the receiver, and wherein the determining the tamper state of the bolt seal uses contents of the electrical signal from the receiver.

7. A system for securing freight container seals with electronic sensors, comprising:
    a sensor clamp housing;
    one or more sensing portals positioned within the sensor clamp housing, wherein the sensor clamp housing is operable to receive a bolt seal through each of the one or more sensing portals;
    one or more seal sensors proximate to the one or more sensing portals;
    a transmitter configured to transmit an RF signal through the bolt seal as an antenna at a first end of the bolt seal, wherein the one or more seal sensors is configured to detect the RF signal at a second end of the bolt seal opposite the first end;
    a sensor clamp module, within the sensor clamp housing, and operable to activate and interrogate the seal sensors to determine a tamper state of the bolt seal; and
    a sensor clamp wireless module, coupled to the sensor clamp module, and operable to communicate the tamper state of the bolt seal wirelessly to a communications gateway.

8. The system of claim 7, wherein the sensor clamp housing comprises hardened metal to resist tampering.

9. The system of claim 7, wherein the sensor clamp housing comprises a substantially C-shaped geometry having two sensing portals with one at each end of the C-shaped geometry.

10. The system of claim 7, wherein the one or more seal sensors are operable to detect one of electrical conductivity, optical detection, radio frequency detection, or magnetic reactivity associated with the bolt seal.

11. The system of claim 7, further comprising insert sleeves positioned within the sensing portals to accommodate container seals having various cross-sectional geometries.

12. The system of claim 7, further comprising:
the bolt seal, wherein the bolt seal includes an optical emitter and receiver generating an associated electrical signal from the receiver, and wherein the tamper state of the bolt seal is determined from the contents of the electrical signal from the receiver.

13. The system of claim 7, wherein the communications gateway is a wireless transmitter operating on the Long Range (LoRa) modulation standard.

14. A system for securing freight container seals with electronic sensors, comprising:
a bolt shaft having a first end and a second end;
a sensor clamp housing, wherein the sensor clamp housing is shaped to capture the bolt shaft, wherein the sensor clamp housing includes,
an immobile seal sensor secured inside the sensor clamp housing, wherein the seal sensor is configured to sense an electro-magnetic property of the bolt shaft,
a transmitter configured to transmit an RF signal through the bolt shaft as an antenna at the first end of the bolt shaft, wherein the seal sensor is configured to detect the RF signal at the second end of the bolt shaft, and
a wireless transmitter configured to transmit information based on the electro-magnetic property of the bolt shaft.

15. The system of claim 14, wherein transmitter is configured to transmit the information on the Long Range (LoRa) modulation standard.

16. The system of claim 14, wherein the electro-magnetic property includes at least one of electrical conductivity, optical detection, radio frequency detection, and magnetic reactivity of the bolt shaft.

17. The system of claim 14, wherein the sensor clamp housing further includes a sensor clamp processor configured to determine a tamper state of the bolt shaft from contents of the electro-magnetic property of the bolt shaft, and wherein the information includes the tamper state.

* * * * *